United States Patent [19]

Baker

[11] Patent Number: 4,925,154

[45] Date of Patent: May 15, 1990

[54] GATE VALVE WITH SUPPLEMENTAL ACTUATOR

[75] Inventor: Gerald S. Baker, Houston, Tex.

[73] Assignee: Cameron Iron Works USA, Inc., Houston, Tex.

[21] Appl. No.: 395,494

[22] Filed: Aug. 18, 1989

Related U.S. Application Data

[63] Continuation-in-part of Ser. No. 310,696, Feb. 15, 1989, Pat. No. 4,871,143.

[51] Int. Cl.$^5$ .................. F16K 31/122; F16K 31/52
[52] U.S. Cl. .......................... 251/58; 74/54;
74/56; 74/110; 92/14; 92/65; 92/130 B;
251/63.6; 251/243; 251/244; 251/246
[58] Field of Search .............. 74/54, 56, 110; 92/14,
92/65, 130 B; 251/58, 63.5, 63.6, 229, 232, 238,
239, 240, 241, 243, 244, 246, 263

[56] References Cited

U.S. PATENT DOCUMENTS

| | | | |
|---|---|---|---|
| 3,812,766 | 5/1974 | Weiss | 92/14 |
| 4,070,002 | 1/1978 | Bonafous | 251/58 |
| 4,445,424 | 5/1984 | Foster | 92/5 R |
| 4,519,575 | 5/1985 | Akkerman et al. | 251/58 |
| 4,523,516 | 6/1985 | Foster et al. | 92/130 B |
| 4,549,719 | 10/1985 | Baumann | 251/58 |
| 4,651,970 | 3/1987 | Sadler | 251/63.6 |
| 4,684,103 | 8/1987 | Baumann | 251/58 |
| 4,729,544 | 3/1988 | Baumann | 251/229 |
| 4,791,856 | 12/1988 | Heim et al. | 251/63.6 |

Primary Examiner—George L. Walton

[57] ABSTRACT

An improved gate valve having a body with a chamber and an inlet and an outlet extending therethrough into said chamber, a gate mounted for reciprocation in said chamber between open and closed positions, a pressure responsive actuator having a housing, a piston, a connection to the gate and an actuating stem extending from the housing, a supplemental actuator having a connection to the actuator housing, an operating stem connected to the actuating stem, the operating stem having a shoulder facing in the direction opposite to the direction of closing movement of the gate, roller levers pivotally mounted to be in engagement with the exterior of the operating stem and a spring urging the roller levers into tight engagement with the operating stem, the roller levers pivoting on engagement with the stem shoulder to exert a closing force on the stem. In a modified form of the invention, lever-roller assemblies are provided within the actuator to increase the closing force of the piston during the last portion of its stroke by changing the spring force provided by the actuator spring.

4 Claims, 10 Drawing Sheets

GATE VALVE WITH SUPPLEMENTAL ACTUATOR

CROSS REFERENCE TO RELATED APPLICATIONS

The present application is a continuation-in-part application of my prior copending application Ser. No. 07/310,696, filed Feb. 15, 1989, now U.S. Pat. No. 4,871,143.

BACKGROUND

The present invention relates to a gate valve having an attachment which increases the force of closing as the gate approaches the final stages of its closing movement. U.S. Pat. No. 4,519,575 discloses a gate valve having an actuator which utilizes cam surfaces which are engaged by spring loaded cam following carriages and the cam surface is shaped to provide a larger force with the final closing movement of the valve so that it can shear a wire line extending therethrough. The closing force is transmitted from the following carriages to a plate secured to the valve stem. This valve relies entirely on the force from the cam follower for its closing force.

U.S. Pat. Nos. 4,445,424 and 4,523,516 disclose bellows type or Belleville washer type of springs used in actuators for valves.

U.S. Pat. No. 4,651,970 discloses a gate valve suitable for cutting wire line in its closing movement which includes an actuator and an attached energy storage assembly which is compressed in the initial stages of the actuator stroke to open the valve and releases the energy in the final stages of the valve closing stroke. This supplemental closing force is achieved by releasable latch mechanisms which release only near the end of the closing stroke so that the force of the compressed spring of the assembly is added to the actuator's closing force.

SUMMARY

The improved gate valve of the present invention includes a readily attachable assembly which provides relatively no additional force or drag on the operating stem during a substantial portion of the opening and closing of the valve gate but adds a substantial closing force to the stem near the last small portion of the closing movement. The gate valve includes a body having a gate chamber with inlet and outlet passages extending into the chamber, a gate mounted in the chamber for reciprocation therein between open and closed positions, a gate stem connected to the gate and extending beyond the valve body, an actuator mounted on the body and engaging the gate stem to control the reciprocating movement of the gate, an actuator stem extending beyond the actuator, a supplemental actuator having an operating stem releasably secured to the actuator stem, said operating stem having a cylindrical shape over most of its length and a reduced diameter portion near one of its ends, a roller lever being in engagement with the exterior of the operating stem, means biasing said roller lever to exert a substantial axial force on the operating stem as the roller lever engages such reduced diameter portion of the operating stem. In a modified form of the present invention the roller and lever assembly is made a part of the actuator assembly so that the additional force is provided to the piston during the last portion of the closing stroke of the piston to ensure proper shearing by the valve member in closing.

An object of the present invention is to provide an improved gate valve having an operator which provides substantially no increase in the closing force for moving the gate to its closed position during the major length of the stroke and then adds a very substantial closing force during the last short portion of the closing movement of the gate.

Another object is to provide an improved gate valve with a supplemental device for adding substantial closing force for the final closing movement of the gate.

A further object is to provide an improved supplemental actuator which can be easily and quickly installed on a gate valve to provide additional closing force on the gate stem during the final closing movement of the gate.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
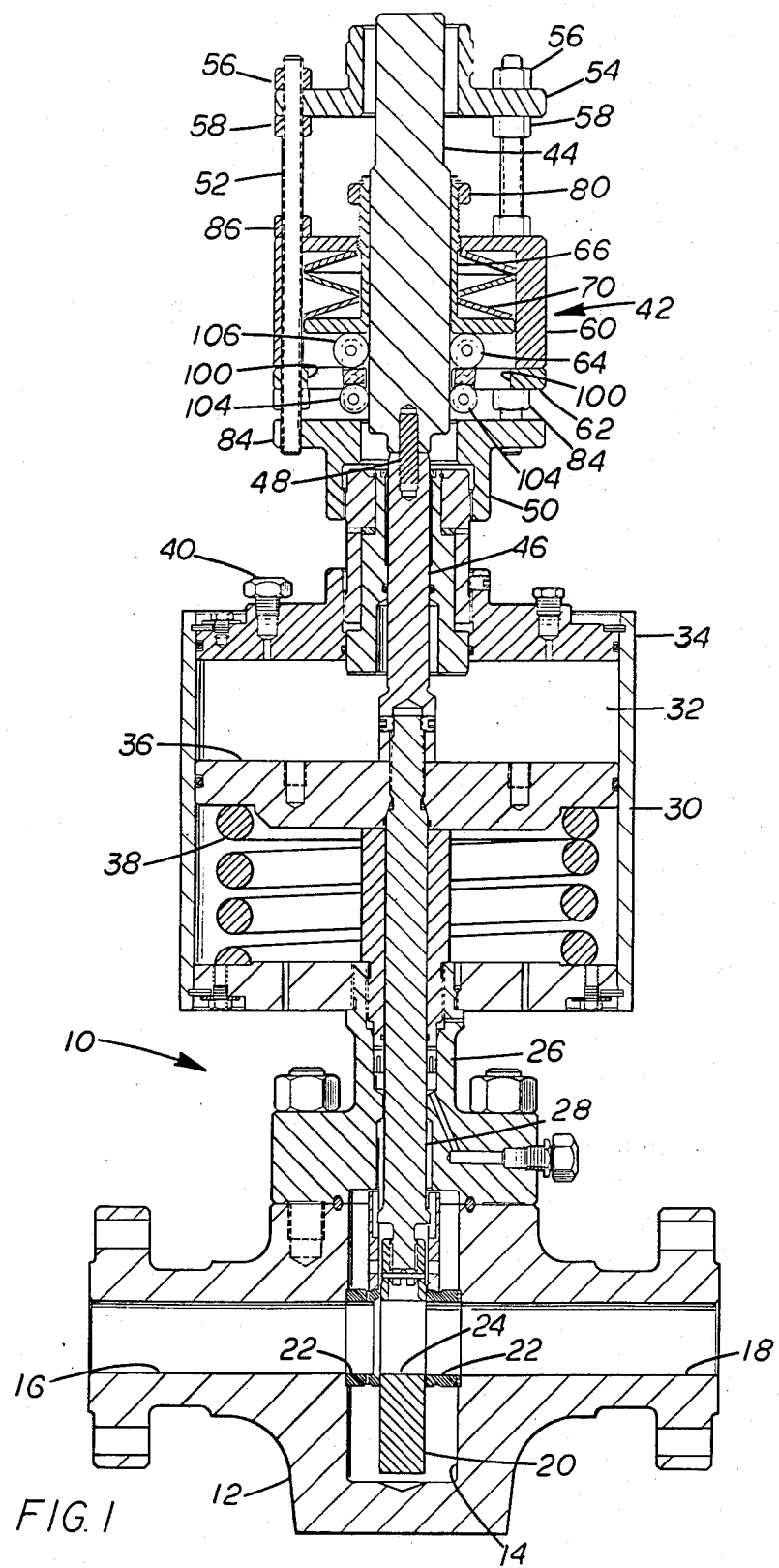
FIG. 1 a sectional view of the improved gate valve of the present invention with the improved supplemental actuator attached thereto and shown in its open position.
Figure 2:
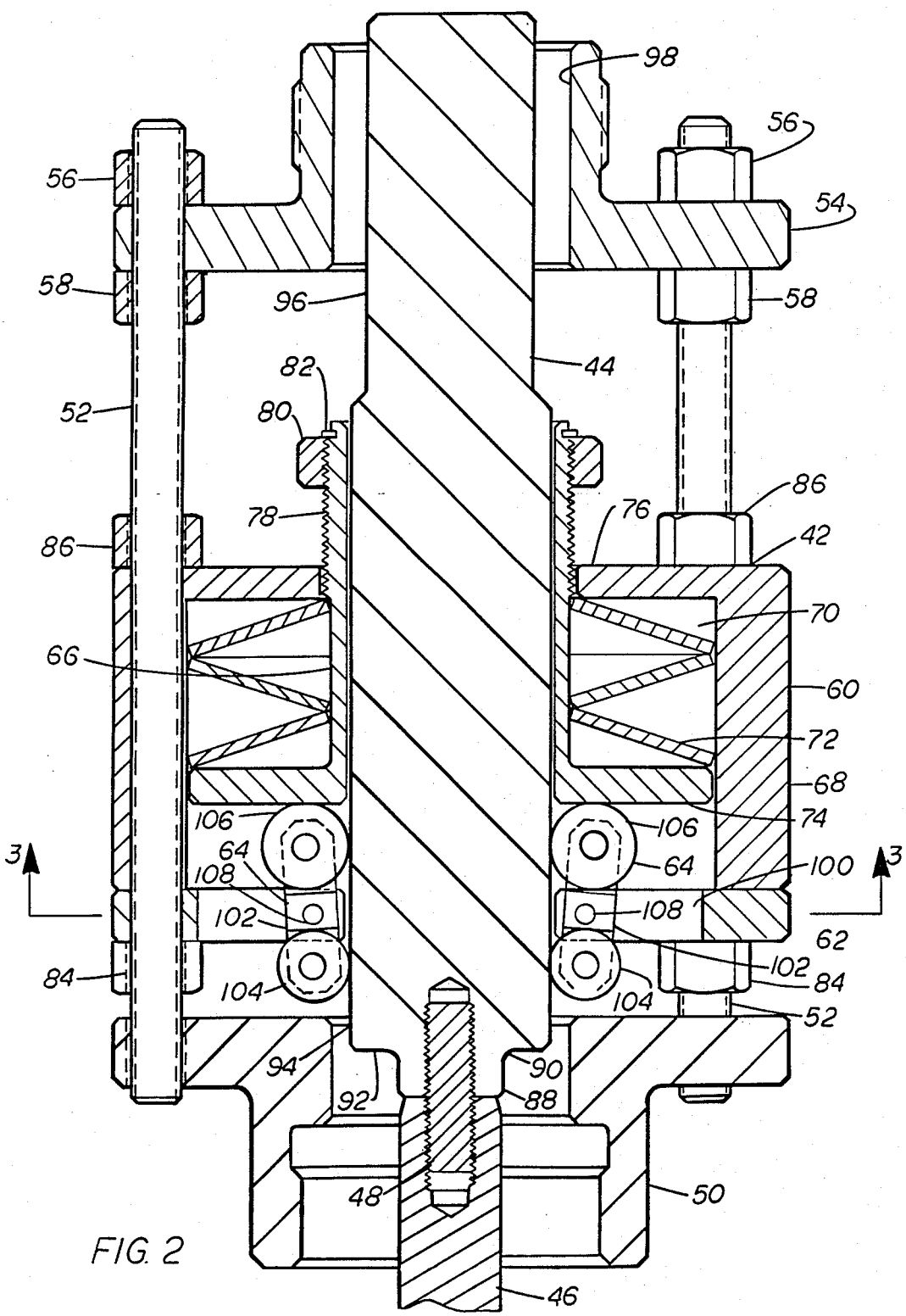
FIG. 2 is a detail sectional view of the improved supplemental actuator.

Valve 10 as shown in FIG. I includes body 12 having a valve chamber 14 therein and inlet 16 and outlet 18 in communication through body 12 with the valve chamber 14. Gate 20 is positioned within chamber 14 and bushings 22 are positioned around the openings of inlet 16 and outlet 18 and in engagement with the sides of gate 20. Gate 20 includes opening 24 therethrough which when aligned with inlet and outlet bushings allows flow therebetween and when not so aligned closes flow through the valve 10. Bonnet 26 is secured to body 12 and gate stem 28 extends from gate 20 through bonnet 2 and into actuator 30. Actuator 30 is a pressure responsive actuator which includes a pressure chamber 32 within housing 34 with piston 36 positioned therein and secured to the upper end of gate stem 28. Spring 38 urges piston 36 in the direction of valve closing. Suitable connections 40 are provided for supplying pressure fluid into chamber 32 to urge the piston in the opening direction and spring 38 provides the force for returning piston 36 in the closing direction during the major portion of its closing stroke and supplemental actuator 42 provides additional closing force during the final increments of the closing stroke to ensure that gate 20 closes even though a wire line may be extending through valve 10.

Figure 3:
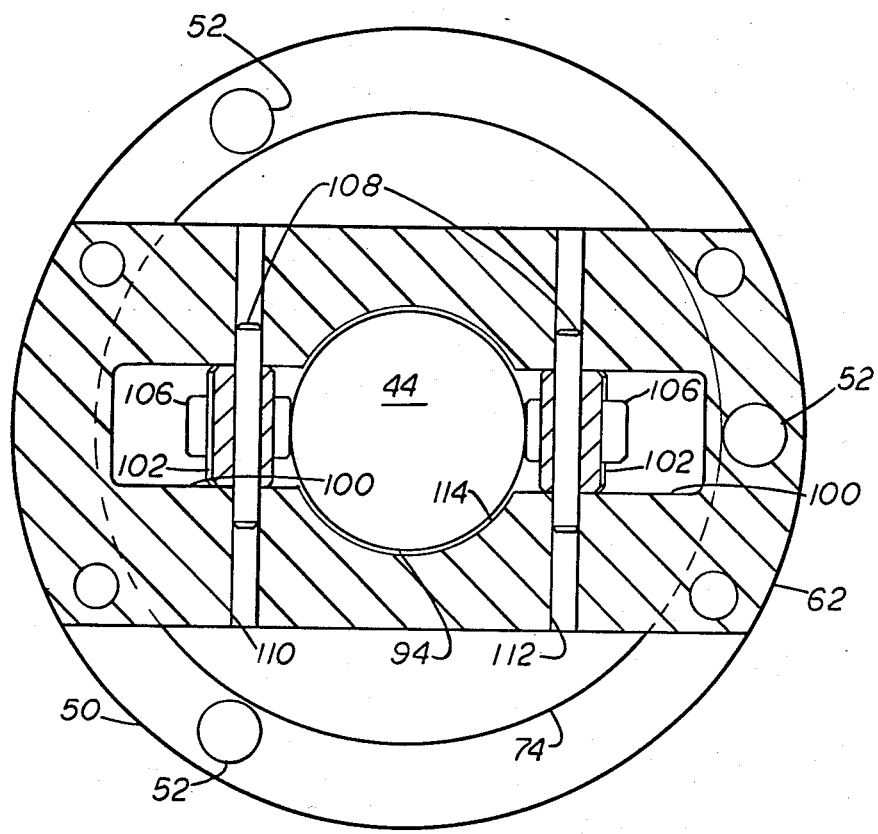
FIG. 3 is a sectional view taken along line 3—3 in FIG. 2.

Supplemental actuator 42 includes operating stem 44 which is secured to the outer end of actuator stem 46 by threaded pin 48. Actuator stem 46 is secured to piston 36 and extends beyond housing 34 as shown. Flange 50 is threaded onto housing 34 and supports supplemental actuator 42 on actuator 30. Studs 52 are threaded into flange 50 and extend and are secured to upper flange 54 by nuts 56 and 58. Carriage 60 includes plate 62 with roller levers 64 mounted thereon as best seen in FIG. 3, inner sleeve 66, outer sleeve 68 and biasing means 70, such as Belleville spring 72. Inner sleeve 66 includes outwardly extending flange 74 and outer sleeve 68 includes inwardly extending flange 76. Biasing means 70 is positioned between flanges 74 and 76 and exerts a force tending to cause sleeves 66 and 68 to move apart. The upper exterior 78 of inner sleeve 66 is threaded to receive nut 80 and snap ring 82 is secured in sleeve 66 to limit the upward travel of nut 80 once it is installed thereon. Nuts 84 and 86 on studs 52 are provided to secure actuator 42 in the desired position with respect to operating stem 44.

Operating stem 44 has an exterior surface which is specifically designed for coaction with roller levers 64. Its end adjacent to actuating stem 46 has a surface 88 having a diameter substantially the same as the diameter of stem 46. Surface 88 ends in shoulder 92 with a suitable rounding or fillet 90. The outer portion of shoulder 92 rounds into cylindrical surface 94 which extends for a length which is at least as long as the stroke of actuator 30. The end of operating stem 44 above surface 94 is reduced in diameter to surface 96 which has any suitable diameter allowing stem 44 freedom of movement through the bore 98 of flange 54.

As seen in FIG. 3, roller levers 64 are supported in slots 100 in plate 62. Each of roller levers 64 includes arm 102 having small roller 104 mounted on the lower end of arm 102 and large roller 106 mounted on the upper end of arm 102. Each of roller levers 64 is pivotally mounted to plate 62 by pin 108 which extends through an opening in arm 102 and has its ends positioned in holes 110 and 112 extending through plate 62 at each side of slot 100. Plate 62 is provided with opening 114 which is sufficiently large to allow operating stem 44 to pass readily therethrough.

It should be noted that supplemental actuator 42 can be varied so that the amount of force developed for the final closing movement of gate 20 can be increased or decreased. An obvious expedient is to change the spring force exerted by spring 72. It is also possible to change the pivot point of roller levers 64 to exert more or less force on operating stem 44.

Figure 4:
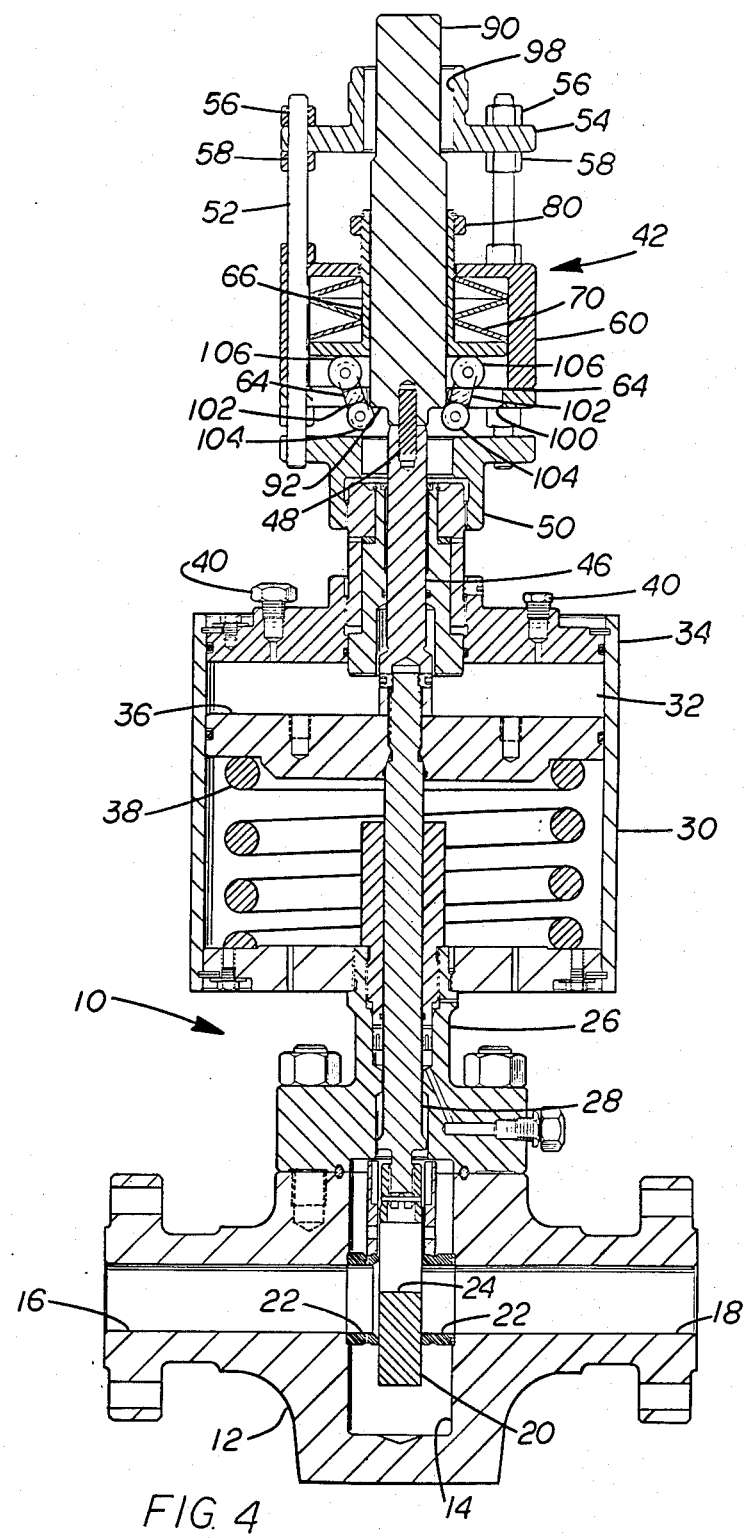
FIG. 4 is a sectional view of the gate valve similar to FIG. 1 but showing the valve nearing the final stages of its closing movement.
Figure 5:
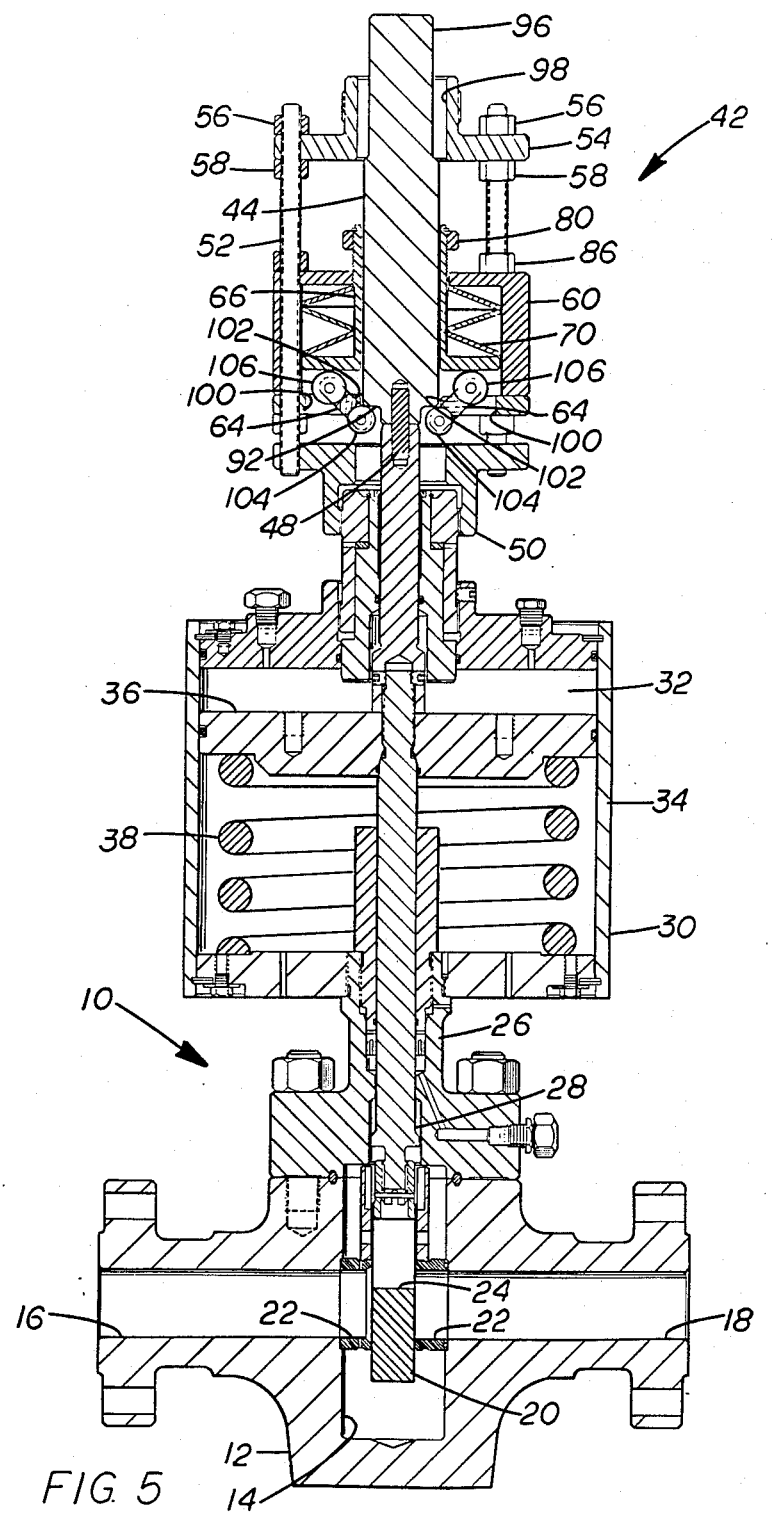
FIG. 5 is another sectional view similar to FIG. 4 but showing the valve in the final stages of its closing movement.
Figure 6:
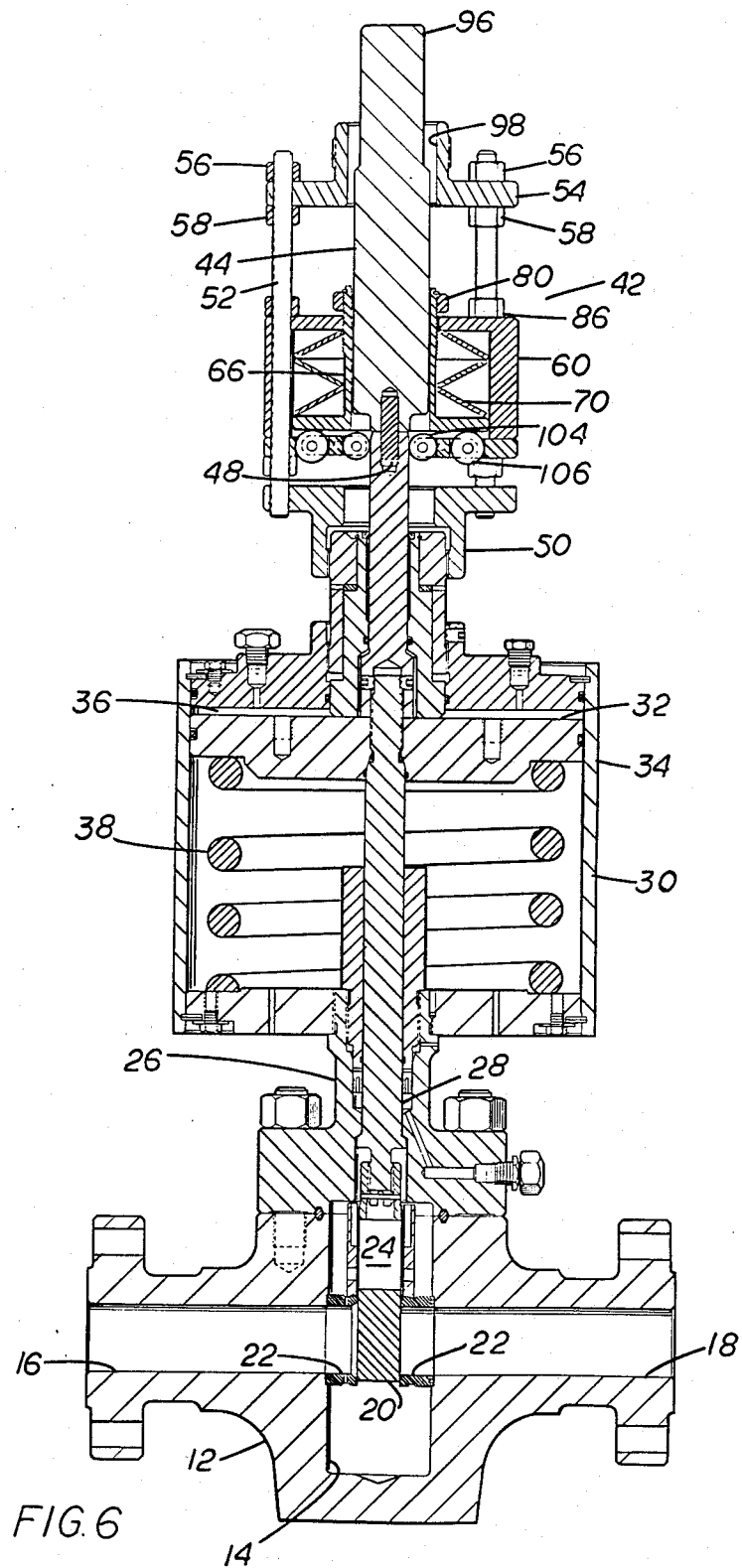
FIG. 6 is another sectional view similar to FIGS. 4 and 5 but showing the valve closed.

In operation, valve 10 functions similarly to other gate valves with actuator 30 controlling the movement of gate 20 responsive to fluid pressure delivered to chamber 32 and also responsive to the force of spring 38 when fluid pressure is vented from chamber 32. When gate 20 is open and is to be closed the pressure fluid is vented from chamber 32 allowing spring 38 to force piston 36 to move gate stem 28 and gate 20 upwardly as shown in FIG. 4. It should be noted that roller levers 64 are in engagement with cylindrical surface 94 of operating stem 44 so no appreciable drag is exerted on the movement of gate 20 by supplemental actuator 42 resisting either opening or closing movement of actuator 30. As small rollers 104 reach the rounded portion of the intersection between surface 94 and shoulder 92 the force of spring 72 exerted on larger roller 106 is transmitted into an upward force on operating stem 44 by causing levers 64 to pivot about pins 108 so that small rollers 104 engage and transmit the force to shoulder 92. The difference in the size of rollers 104 and 106 positions the transmittal of spring force to pivot levers 64 about pins 108 and into force transmitting engagement with shoulder 92. Further upward movement of operating stem 44 allows small rollers 104 to engage shoulder 92 to exert an even greater force because of the pivoting of arms 102 as shown in FIG. 5. The last portion of the movement of operating stem 44 during the closing of gate 20 is shown in FIG. 6 and the pivoting of lever arms 102 has proceed to provide increased force on shoulder 92 to assist in the final closing movement of gate 20.

Figure 7:
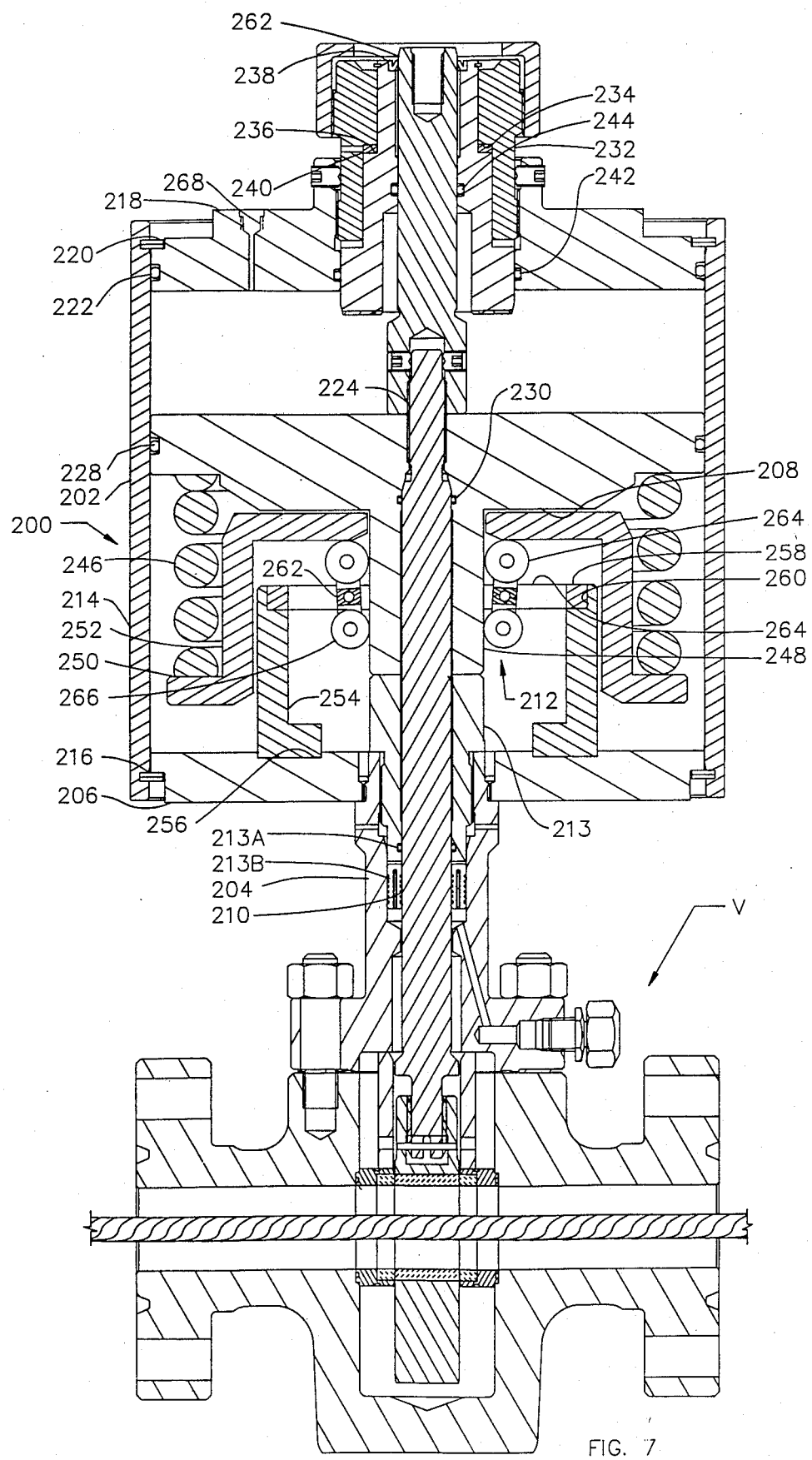
FIG. 7 is a detail sectional view of a modified form of shearing gate valve with an improved actuator of the present invention illustrating the gate, the actuator piston and valve stem in their lower or open position.
Figure 8:
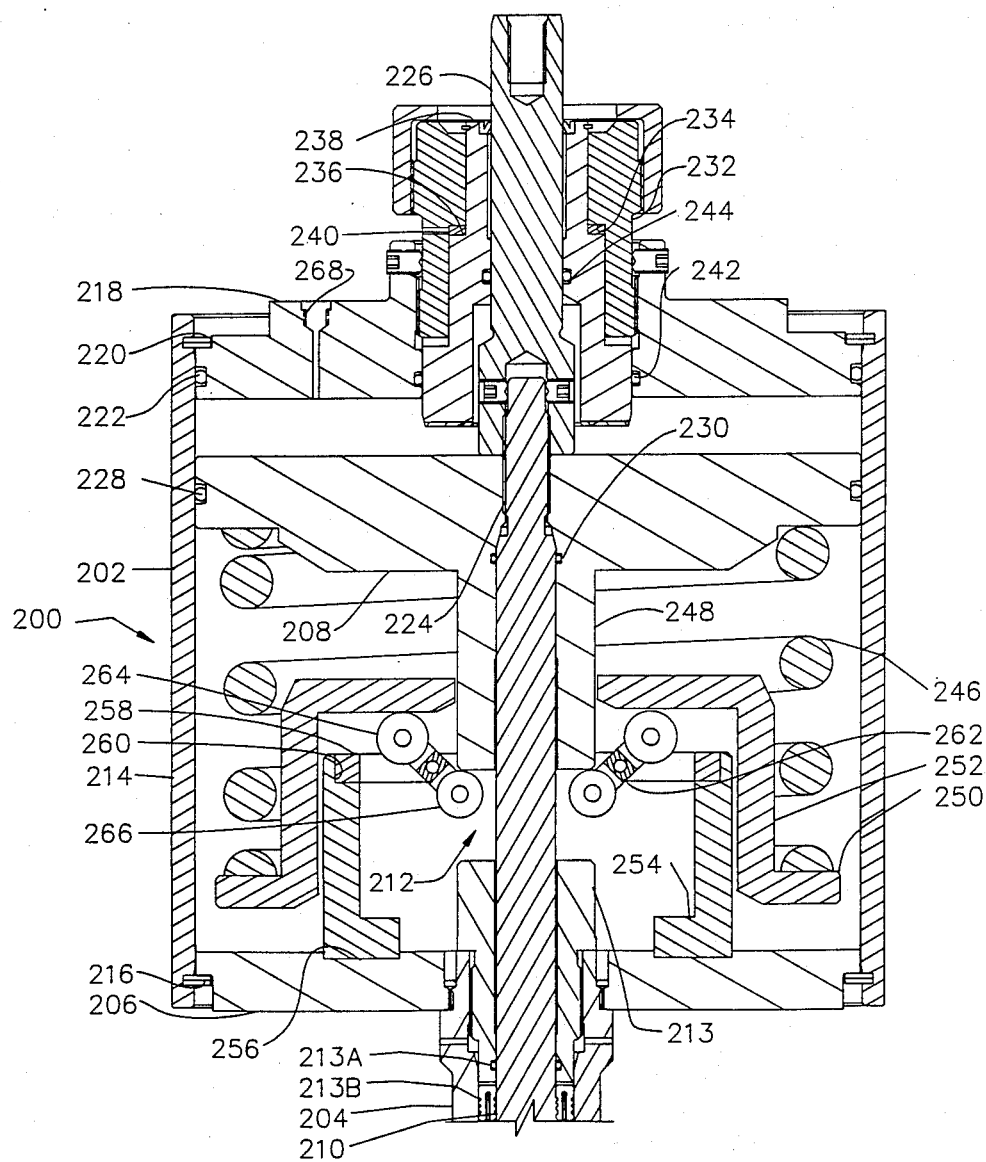
FIG. 8 is a detail partial sectional view of the actuator shown in FIG. 7 during the stroke of the piston when the lever-roller assembly becomes active to add upward or closing force to the force on the piston.
Figure 9:
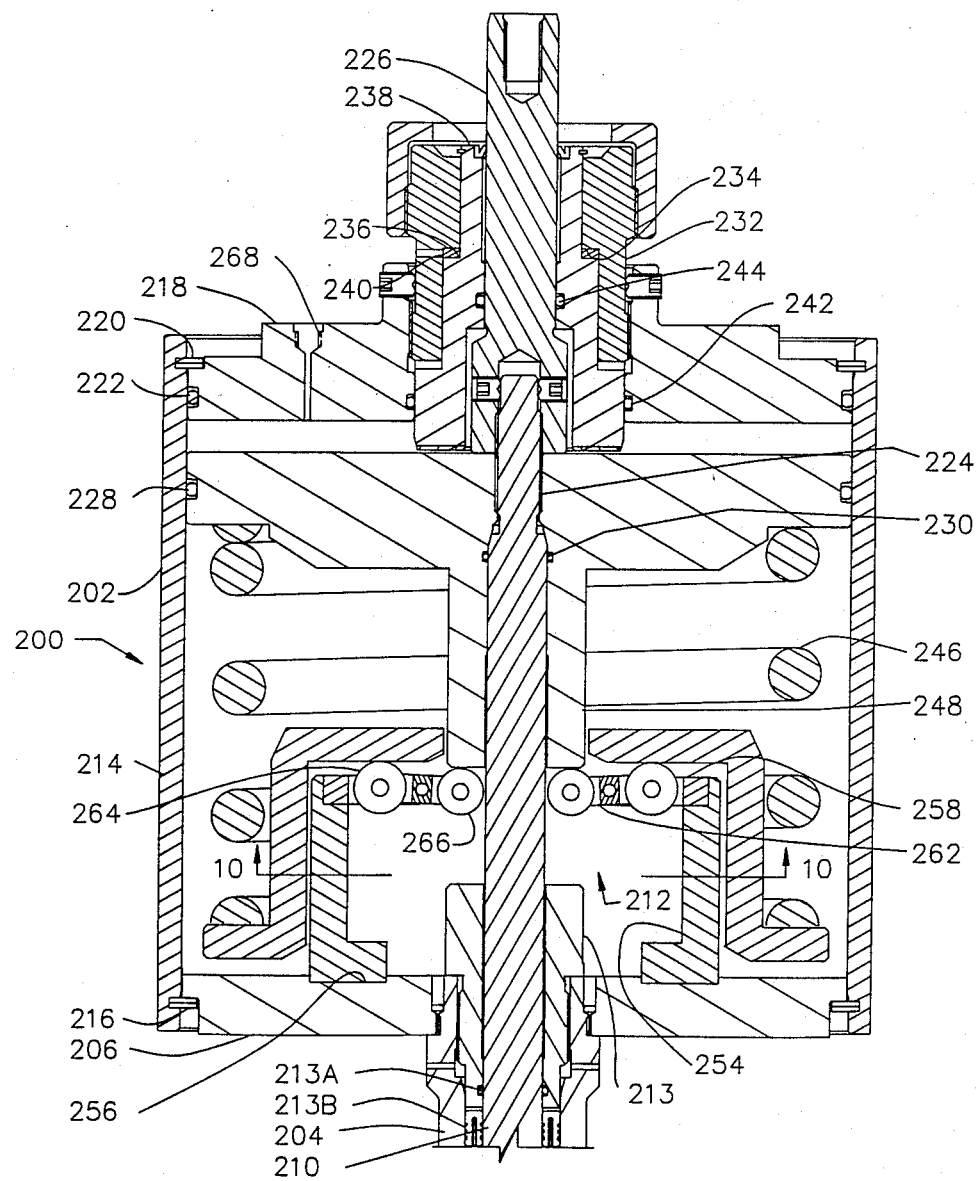
FIG. 9 is another detail partial sectional view of the actuator shown in FIGS. 7 and 8 and illustrating the position of the piston and lever-roller assembly at the completion of the closing stroke of the piston.
Figure 10:
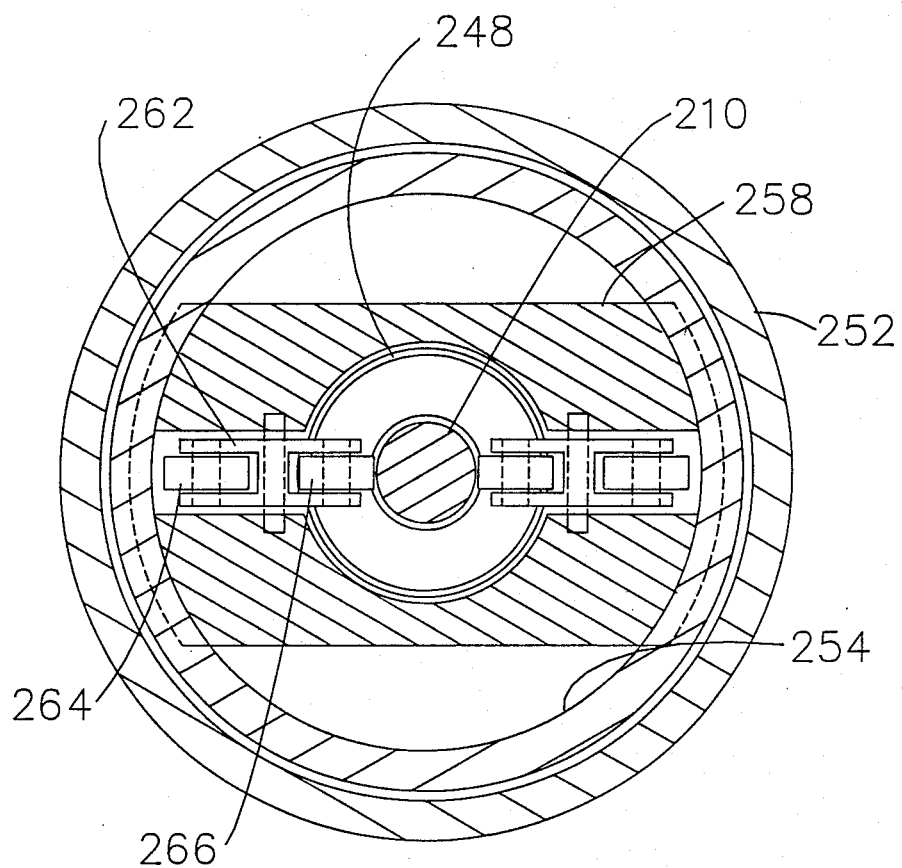
FIG. 10 is a sectional view taken along line 10—10 in FIG. 7 to illustrate the multiple lever-roller assemblies used with the actuator of the present invention and the mounting of the lever-roller assemblies in a the actuator.

Improved actuator 200 of the modified form of valve V of the present invention is shown in FIGS. 7, 8 and 9. Actuator 200 includes housing 202 suitably secured to a shearing gate valve V by tubular portion 204 of bonnet 205, which is threaded into lower housing plate 206, piston 208 which is secured to valve stem 210 and is positioned within housing 202 for movement therein and lever-roller assembly 212 which is also positioned within housing 202 and positioned to increase the closing force of piston 208 during the last portion of its closing stroke. Follower 213 is threaded into the interior of tubular connector 204 and is provided with suitable seals, such as O ring 213A, and packing 213B for sealing against the exterior of valve stem 210. Housing 202 includes tubular shell 214 which has lower plate 206 suitably secured therein by snap ring 216 and upper plate 218 which is suitably secured and sealed within shell 214 by snap ring 220 and sealing element 222, such as an O ring.

Piston 208 is positioned for sliding movement within shell 214 between plates 206 and 218 and is secured to valve stem 210 by threading as shown at 224 and tail rod 226 which is threaded onto the threading 224 at the outer end of valve stem 210. Suitable sealing means, such as 0 rings 228 and 230, are provided for sealing between the exterior of piston 208 and the interior of shell 214 and between the interior of piston 208 and the exterior of valve stem 210.

Upper plate 218 has tubular nut 232 threaded into its interior opening. Nut 232 includes an inner downwardly facing shoulder 234 which faces shoulder 236 on sealing sleeve 238 with ring 240 therebetween to retain sealing sleeve 238 in position within upper plate 218. Sealing means, such as O rings 242 and 244, are provided for sealing between sealing sleeve 238 and the interior of upper plate 218 and against the exterior of tail rod 226.

Spring 246 is positioned within housing 202 in surrounding relationship to piston skirt 248 and has one end in engagement with the underside of piston 208 and its other end in engagement with flange 250 on spring cup 252. Lever-roller assembly 212 is mounted within spring cup 252 and includes ring 254 which is positioned within groove 256 in the upper side of lower plate 206, mounting plate 258 which is positioned within recess 260 in the upper end of ring 254 and levers 262 which are pivotally mounted in inner recesses 264 of mounting plate 258. Each of levers 262 includes large roller 264 pivotally mounted at one end thereof and smaller roller 266 pivotally mounted at the other end.

In operation as shown in FIG. 7, roller 266 is positioned above the depending end of piston skirt 248 and large roller 26 is positioned in engagement with the lower surface of piston cup 252. In this position, lever-roller assemblies 212 offer no axial forces on piston skirt 248. Also in this position, levers 262, mounting plate 258, ring 254, and lower plate 206 react together to form a rigid support for this lower end of spring 246. Therefore, spring 246 exerts an upward force on piston 208 which urges the gate toward the closed position. When piston skirt 248, piston 208 and valve stem 210 have moved to the position shown in FIG. 8, the small rollers begin to push upward on piston skirt 248. Due to the mechanical advantage offered by levers 262, the forces of spring 246 on spring cup 252 and flange 250 is multiplied and transmitted upwardly to the end of piston skirt 248, which in turn transmits the force to valve stem 210. This creates the additional force necessary to ensure the positive shearing of a cable or other structure such as a tubular member extending through valve V. The position of lever-roller assemblies 212 during the shearing action on completion thereof is shown in FIG. 9. As can be seen from this illustration, lever-roller assemblies continue exerting additional upward forces on piston 208 during the entire shearing procedure. Port 268 is provided through upper plate 218 for delivering and venting a pressure fluid to and from the interior of said housing 200 above the upper surface of piston 208.

From this it can be seen the modified form of the invention provides an actuator structure which has a normal closing force delivered by the piston during the initial portions of its stroke and subsequently has a larger shearing force during the last portion of the closing stroke.

What is claimed is:

1. A gate valve comprising
    a body having a chamber with an inlet and an outlet extending through the body into the chamber,
    a gate positioned for reciprocation in said chamber to open and close flow through said inlet and outlet,
    a gate actuator connected to said gate for reciprocating said gate,
    said gate actuator including
    a housing,
    means connecting said housing to said valve body,
    a piston mounted within the housing for reciprocation,
    said piston being connected to said gate,
    a piston spring positioned within said housing and resisting the closing movement of said piston,
    means for delivering and venting a pressure fluid to and from the interior of said housing above said piston,
    a force supplementing structure positioned within said housing and including a plurality of lever-roller assemblies mounted on a roller support structure and a floating piston cup disposed between said piston spring and said roller support structure and supported by said lever-roller assemblies,
    said lever-roller assembly coacting with said piston and said piston cup during all movement of said gate valve while permitting said spring to increase the closing force delivered by said piston during the last portion of its stroke whereby any structure extending through said inlet and outlet is positively sheared by the closing of the gate.

2. A gate valve according to claim 1 wherein said force supplementing structure further includes
    a skirt on said piston depending from the interior portion thereon,
    said roller support structure including a mounting plate, said lever-roller assemblies including a lever pivotally mounted near its mid point to said mounting plate and a pair of rollers mounted on opposite ends of said lever, one of said rollers being positioned for engagement of the lower end of said piston skirt, the other of said rollers being positioned for engagement of the upper end of said piston cup, with means biasing said lever-roller assemblies so that they exert no upward force on said piston skirt during the initial closing movement thereof and exert a substantial upward force on said piston skirt during the final closing movement thereof to thereby increase the closing force exerted by said piston.

3. A gate valve according to claim 2 wherein said biasing means for said lever roller assemblies is the force of said piston spring.

4. A gate valve according to claim 2 wherein said biasing means includes
    an outer flange on said piston cup against which said piston spring is seated,
    assemblies being mounted to said plate and positioned to utilize the force of said piston spring to increase the closing force on the piston during the final closing movement of the gate.

* * * * *